(12) United States Patent
Harboe et al.

(10) Patent No.: US 10,131,099 B2
(45) Date of Patent: Nov. 20, 2018

(54) SYSTEM AND METHOD FOR FEEDING A FLUID TO A MOLD FOR MOLDING A REINFORCED COMPOSITE STRUCTURE

(75) Inventors: Niels Harboe, Hadsund (DK); Casper Houmann Jensen, Aalborg (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 962 days.

(21) Appl. No.: 14/356,160

(22) PCT Filed: Feb. 10, 2012

(86) PCT No.: PCT/EP2012/052270
§ 371 (c)(1),
(2), (4) Date: Jul. 31, 2014

(87) PCT Pub. No.: WO2013/072074
PCT Pub. Date: May 23, 2013

(65) Prior Publication Data
US 2014/0333008 A1    Nov. 13, 2014

(30) Foreign Application Priority Data

Nov. 17, 2011   (EP) ..................................... 11189531

(51) Int. Cl.
*B29C 70/48*    (2006.01)
*B29C 70/54*    (2006.01)
(Continued)

(52) U.S. Cl.
CPC ............ *B29C 70/546* (2013.01); *B29C 31/04* (2013.01); *B29C 70/443* (2013.01); *B29C 70/48* (2013.01);
(Continued)

(58) Field of Classification Search
CPC ............ B29C 33/0061; B29C 33/0066; B29C 2947/92104; B29C 2947/926;
(Continued)

(56) References Cited

U.S. PATENT DOCUMENTS 4,352,567 A * 10/1982 Guibert .................... A21C 1/14
366/323
5,614,135 A * 3/1997 Maleczek ............. B29B 7/7471
264/40.4
(Continued)

FOREIGN PATENT DOCUMENTS

CN          1464828 A      12/2003
CN        101124079 A       2/2008
(Continued)

OTHER PUBLICATIONS

English abstract of JP200051765.*
(Continued)

*Primary Examiner* — Christina A Johnson
*Assistant Examiner* — Xue H Liu
(74) *Attorney, Agent, or Firm* — Beusse Wolter Sanks & Maire

(57) ABSTRACT

A system and method for feeding a composite fluid to a mold for casting a reinforced composite structure, such as a rotor blade for a wind turbine are provided. The system includes a first feeding unit for feeding a first flow of composite fluid to the mold through a first mold inlet, and a second feeding unit for feeding a second flow of composite fluid to the mold through a second mold inlet. The first flow of composite fluid and the second flow of composite fluid are individually controllable.

17 Claims, 2 Drawing Sheets

(51) Int. Cl.
  *B29C 70/44* (2006.01)
  *B29C 31/04* (2006.01)
  *B29L 31/08* (2006.01)
(52) U.S. Cl.
  CPC ..... *B29L 2031/08* (2013.01); *B29L 2031/085* (2013.01); *Y02P 70/523* (2015.11)
(58) Field of Classification Search
  CPC ......... B29C 31/00; B29C 31/06; B29C 31/04; B29C 31/10; B29C 70/546
  USPC ............... 425/130, 145, 147, 449, 162, 200; 264/40.1, 40.4, 319
  See application file for complete search history.

(56) References Cited

U.S. PATENT DOCUMENTS

| | | | |
|---|---|---|---|
| 2002/0086077 A1* | 7/2002 | Noller | A21C 11/16 425/145 |
| 2006/0188378 A1 | 8/2006 | Bech et al. | |
| 2009/0115112 A1 | 5/2009 | Liebmann | |
| 2011/0183029 A1 | 7/2011 | Schibsbye | |

FOREIGN PATENT DOCUMENTS

| | | |
|---|---|---|
| CN | 101128309 A | 2/2008 |
| CN | 102139518 A | 8/2011 |
| EP | 1415782 A1 | 5/2004 |
| EP | 1555104 A1 | 7/2005 |
| EP | 1859920 B1 | 4/2008 |
| EP | 2030763 A1 | 3/2009 |
| EP | 2404743 A1 | 1/2012 |
| JP | 2000051765 A * | 2/2000 |
| WO | 2006058541 A1 | 6/2006 |
| WO | 2009103736 A2 | 8/2009 |

OTHER PUBLICATIONS

Campbell et al; "Manufacturing processes for advanced composites"; Manufacturing Processes for Advanced composites, Elsevier Advanced Technology; pp. 304-356; ISBN: 978-1-85617-415-2; XP002580602; 2004.

* cited by examiner

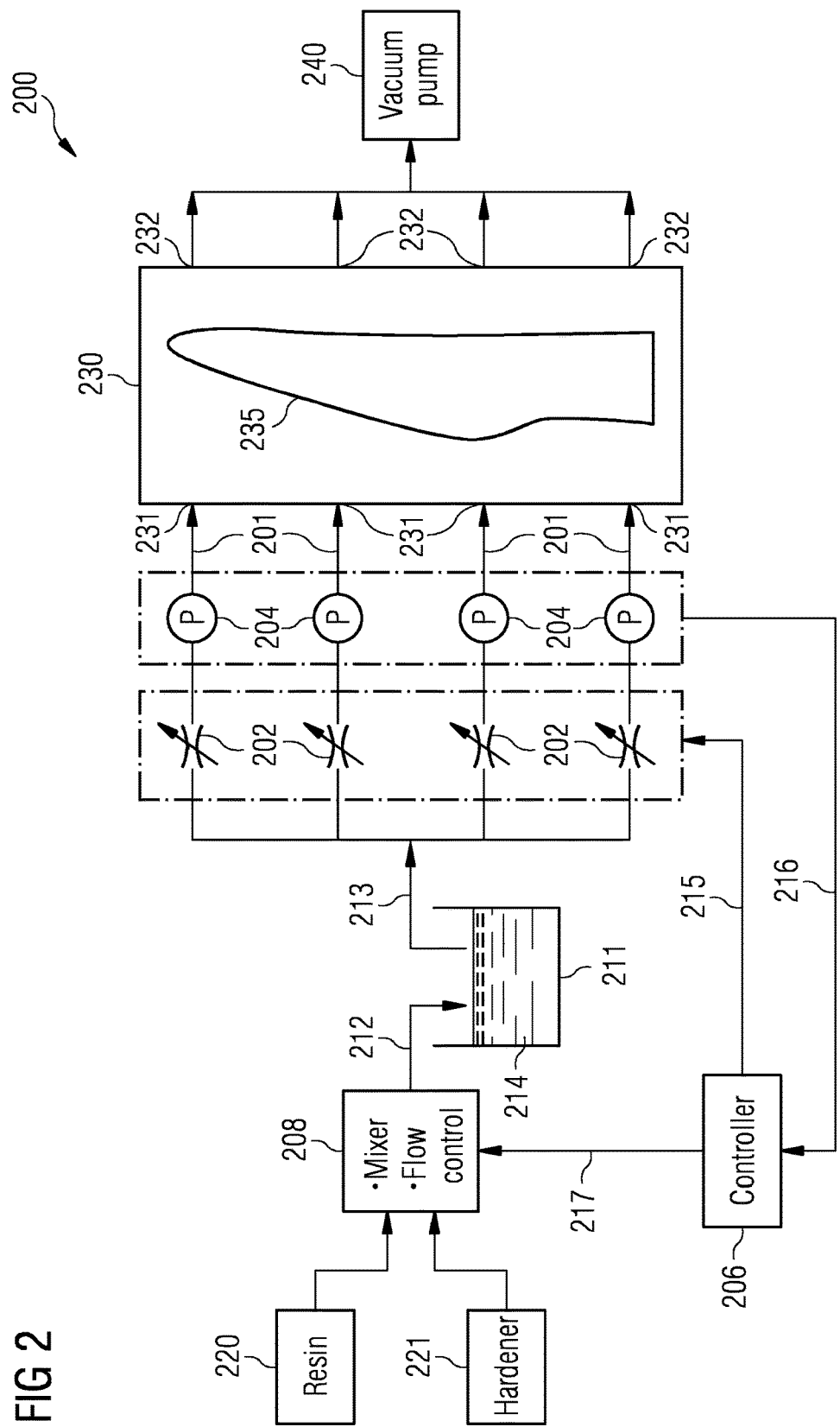

SYSTEM AND METHOD FOR FEEDING A FLUID TO A MOLD FOR MOLDING A REINFORCED COMPOSITE STRUCTURE

CROSS REFERENCE TO RELATED APPLICATIONS

This application is the U.S. National Stage of International Application No. PCT/EP2012/052270 filed Feb. 10, 2012, and claims the benefit thereof. The International Application claims the benefit of European Application No. EP 11189531 filed Nov. 17, 2011. All of the applications are incorporated by reference herein in their entirety.

FIELD OF INVENTION

The present invention relates to the field of casting reinforced composite structures, more particularly to casting of blades for wind turbines.

ART BACKGROUND

Reinforced composite structures, such as rotor blades for wind turbines, can be produced by means of a process known as VARTM (Vacuum Assisted Resin Transfer Molding). In such a process, which is e.g. described in WO 2009/103736 A2, resin and hardener is mixed in a mixer which in turn supplies the mixed resin to the mold. The flow of the mixed resin to the mold is driven by vacuum in the material to be casted and is, depending on the size of the mold, provided through one or more mold inlets. The mixer is normally only capable of supplying the mixed resin within a certain flow range. Furthermore, the needed flow for the cast may vary over time during the casting process. Therefore, the mixed resin is supplied via a buffering container which can compensate for this difference between supply and need. However, such a buffering container may release unhealthy vapors to the environment or even accidentally be tipped-over. Accordingly, the buffering container has a negative influence on the working environment.

When using the above described VARTM process, it is difficult to control the propagation of resin in the laminate. This is due to the fact that areas with a relatively high concentration of fiber material constitute a higher flow-resistance than areas with a relatively low concentration of fiber material.

EP 1 859 920 B1 describes how the above problem can be reduced by adding distribution layers to the material which is to be casted. Such distribution layers make it possible for the resin to easier propagate to other areas of the structure. However, the distribution layers do not contribute to the strength of the casted structure after curing. Further, if the distribution layers are removed from the cured structure, they leave a negative impression on the surface of the structure, such that additional post-treatment is required to re-establish the desired surface form.

A further problem of the VARTM process is that static pressure drops may occur between mold inlets which are arranged at different heights. Such pressure differences will cause different amounts of resin to flow through the mold inlets per time unit.

There may be a need for an improved and simple way of casting composite structures.

SUMMARY OF THE INVENTION

This need may be met by the subject matter according to the independent claims. Advantageous embodiments of the present invention are set forth in the dependent claims.

According to a first aspect of the invention, there is provided a system for feeding a composite fluid to a mold for casting a reinforced composite structure, in particular a rotor blade for a wind turbine. The provided system comprises (a) a first feeding unit for feeding a first flow of composite fluid to the mold through a first mold inlet, and (b) a second feeding unit for feeding a second flow of composite fluid to the mold through a second mold inlet. The first flow of composite fluid and the second flow of composite fluid are individually controllable.

This aspect of the invention is based on the idea that by individually controlling the flow of composite fluid through the respective mold inlets, the propagation of the composite fluid in the fiber material within the mold during the casting process can be controlled and a desired distribution of the composite fluid can be achieved.

The system is preferably designed for use with any kind of mold for casting reinforced composite structures. In particular, the system is designed to be used together with a mold for casting a rotor blade for a wind turbine. Such a mold may, in its closed state where e.g. upper and lower mold halves are tightly connected with each other, be substantially cylindrical and may have a length of up to about 60 m or more, depending on the length of the blade to be casted, and a height of up to about 3 m or more, depending on the cross-sectional size of the blade to be casted. The mold may comprise a plurality of inlets through which the composite fluid, e.g. a mixture of resin and hardener, can be fed. The inlets may be distributed longitudinally and/or circumferentially along the mold.

Each of the first feeding unit and the second feeding unit preferably comprises a tube or a pipe which is designed to be respectively connected with the first and second mold inlets, e.g. by means of suitable connecting pieces. The tubes or pipes may be made from any flexible or hard material which is suitable for transferring the composite fluid from a source to the mold.

The flow of composite fluid into the mold may be caused or assisted by providing a vacuum or negative pressure within the mold, e.g. by means of a vacuum pump.

The flow of composite fluid through the first feeding unit is preferably controlled in accordance with a first function of time. Similarly, the flow of composite fluid through the second feeding unit is preferably controlled in accordance with a second function of time. Thereby, appropriate amounts of composite fluid can be provided to different parts or sections of the mold at different times during the casting process, and an optimal distribution of the composite fluid can be achieved at any time during the casting process.

According to an embodiment of the invention, the system further comprises (a) a first flow control unit for controlling the flow of composite fluid fed by the first feeding unit, and (b) a second flow control unit for controlling the flow of composite fluid fed by the second feeding unit.

The first flow control unit is preferably a valve provided as a part of the first feeding unit, e.g. at some point along a tube or pipe of the first feeding unit. Alternatively, the valve is provided at a connection between the first feeding unit and the source of composite fluid, or at the connection between the first feeding unit and the first mold inlet. Similarly, the second flow control unit is preferably a valve provided as a part of the second feeding unit, e.g. at some point along a tube or pipe of the second feeding unit. Alternatively, the valve is provided at a connection between the second feeding unit and the source of composite fluid, or at the connection between the second feeding unit and the second mold inlet. The valve of the first and second flow control units may be any suitable type of valve and may also be constituted by a clamp which in the case of a flexible tube or pipe may be operable to compress and decompress the tube or pipe, thereby adjusting the effective cross-sectional area of the tube or pipe. The respective valves of the first and second flow control units may be identical or different.

Thereby, the first flow of composite fluid to the mold and the second flow of composite fluid to the mold can be precisely and independently controlled.

According to a further embodiment of the invention, the first flow control unit and the second flow control unit are manually controllable.

The manual control is preferably provided by a mechanical actuator, such as a handle or a wheel, assigned to each of the first and second flow control units. Alternatively, the mechanical control is preferably provided by an electronic regulator which may be controlled by an operator via a computer system.

Thereby, the first and second flows of composite fluid to the mold can be controlled individually by one or more operators during the casting process.

According to a further embodiment of the invention, the system further comprises (a) a first sensor configured to detect a first value which is indicative of the flow rate of the first flow of composite fluid, and (b) a second sensor configured to detect a second value which is indicative of the flow rate of the second flow of composite fluid.

The first sensor is preferably a pressure sensor or a flow meter. Similarly, the second sensor is preferably a pressure sensor or a flow meter.

Thereby, first and second values which are respectively indicative of the flow rate of the first and second flow of composite fluid can be obtained throughout the casting process. By displaying the first and second values, e.g. by means of suitable analog or digital displays or directly on a computer system display, the first and second values can be considered by an operator or by other parts of the system.

According to a further embodiment of the invention, (a) the first sensor is adapted to be arranged at the first mold inlet or at a first position within the mold, and (b) the second sensor is adapted to be arranged at the second mold inlet or at a second position within the mold.

By arranging the first sensor at the first mold inlet, i.e. in the vicinity of the first mold inlet such as in a tube or pipe of the first feeding unit, in a connecting piece which connects the first feeding unit and first mold inlet, or directly in the first mold inlet, the first value will be directly indicative of the flow rate of the first flow. The first sensor may also be arranged within the mold, preferably at a selected position on the inner surface of the mold. In the latter case, the first value is indicative of the flow rate of composite fluid to a particular region within the mold. In both cases, the first sensor can provide information on the current flow of composite fluid to a particular region or section of the mold. The preceding considerations regarding the position of the first sensor apply equally to the position of the second sensor.

According to a further embodiment of the invention, the system further comprises a controller for automatically controlling the first flow control unit and the second flow control unit based on the first value and on the second value.

The controller is preferably a computer system with interfaces for receiving signals representing the first and second values and for transmitting control signals to the first and second flow control units. The control signals are preferably generated by using the first and second values as feedback signals in a control algorithm.

Thereby, the controller may provide individual control signals to each of the first and second flow control units and thus achieve that the first flow of composite fluid and the second flow of composite fluid are kept at, or at least close to, desired values. The desired values may be predetermined individual constants. Alternatively, the desired values may be functions of time in accordance with a particular casting process, and/or they may be functions of values indicative of the flow rate through other feeding units. Furthermore, one desired value may be constant and another desired value may be determined as a function of time and/or a value indicative of the flow rate through another feeding unit. In other words, the desired value for the flow fed by the first feeding unit may be a predetermined constant, or it may be determined as a function of time and/or the flow fed by the second feeding unit. Thus, the flow of composite fluid fed by the first and second feeding units may be controlled such that a desired relation between the first and second flows of composite material is obtained or at least approximated. Accordingly, the first and second flows may be kept approximately equal such that a uniform distribution of composite fluid within the mold may be achieved.

According to a further embodiment of the invention, the controller is adapted to reduce the first flow if the first value exceeds a first threshold value or if the second value is below a second threshold value.

The first threshold value may be defined in accordance with the casting process, i.e. such that the flow of composite fluid fed by the first feeding unit is kept below a certain level. The first threshold may be a function of time such that different amounts of composite fluid is allowed to flow to a particular region of the mold at certain times during the casting process. The first threshold may also be an upper limit which assures that composite fluid is not caused to leak to the environment.

The second threshold value is particularly relevant for the case that a certain amount of composite fluid is provided by a common source and distributed between the first feeding unit and the second feeding unit. Thereby, if the second value gets below the second threshold value, i.e. a lower limit defined by the particular casting process, the second flow of composite flow may be increased by reducing the first flow (e.g. by closing or narrowing a valve of the first flow control unit) such that a larger amount of composite fluid will be forced towards the second feeding unit. This effect may be enhanced by controlling the second flow control unit to increase the flow of composite fluid fed by the second feeding unit. By keeping the flow above a certain lower limit, the duration of the casting process can be decreased as it will not be necessary to wait for the necessary amount of composite fluid to be fed very slowly to the mold.

According to a further embodiment of the invention, the system further comprises a mixing device which is configured to provide composite fluid to the first feeding unit and to the second feeding unit.

The mixing device is preferably a mixer which is capable of providing a desired composite fluid, such as a mixture of resin and hardener. The mixing device may further be capable of controlling an output flow of composite fluid as a function of time. Thereby, the mixing device may provide the necessary amount of composite fluid at any time during the casting process.

According to a further embodiment of the invention, the mixing device comprises (a) a first mixing unit configured to provide composite fluid to the first feeding unit, and (b) a second mixing unit configured to provide composite fluid to the second feeding unit.

The first and second mixing units are preferably mixers which are capable of providing a desired composite fluid, such as a mixture of resin and hardener. Each of the first and second mixing units may further be capable of controlling an output flow of composite fluid as a function of time. Thereby, the first and second mixing units may respectively provide the necessary amounts of composite fluid to the first and second feeding units at any time during the casting process.

According to a further embodiment of the invention, the controller is further adapted to control the flow of composite fluid output by the mixing device.

The controller may take the first value and the second value into consideration when controlling the flow of composite fluid output by the mixing device. Thereby, it can be assured that the necessary amount of composite fluid is available to the first feeding unit and to the second feeding unit during the entire casting process and, consequently, the duration of the casting and curing process can be kept at a minimum.

According to a further embodiment of the invention, the system further comprises a third sensor configured to detect a third value which is indicative of the flow rate of the flow of composite fluid output by the mixing device. The controller is preferably further adapted to control the flow of composite fluid output by the mixing device based on this third value.

Thereby, the system can determine in a simple manner whether the output of composite fluid from the mixing device should be adjusted without having to process both the first value and the second value.

According to a further embodiment of the invention, the system further comprises a buffering container arranged between the mixing device and the first feeding unit and second feeding unit.

The buffering container may be an open or closed container to which composite fluid is preferably fed from the mixing device. The first feeding unit and the second feeding unit are connected to the buffering container such that they are fed with composite fluid. Thereby, if at some time during the casting process, the sum of the flows fed by the first feeding unit and the second feeding unit to the mold is less than the flow of composite fluid provided by the mixing device, leaks of composite fluid can be avoided. In the case where the mixing device comprises a first and a second mixing unit, the buffering container may be constituted by a first and a second container unit provided separately between the first mixing unit and the first feeding unit respectively between the second mixing unit and the second feeding unit.

According to a further aspect of the invention, there is provided a method of feeding a composite fluid to a mold for casting a reinforced composite structure, in particular a rotor blade for a wind turbine. The provided method comprises (a) feeding a first flow of composite fluid to the mold through a first mold inlet, (b) feeding a second flow of composite fluid to the mold through a second mold inlet, and (c) individually controlling the first flow of composite fluid and the second flow of composite fluid.

This aspect of the invention is based on the idea that by individually controlling the flow of composite fluid through the respective mold inlets, the propagation of the composite fluid in the fiber material within the mold during the casting process can be controlled and a desired distribution of the composite fluid can be achieved.

According to a yet further aspect of the invention, there is provided a rotor blade for a wind turbine manufactured by means of the method according to the preceding aspect.

Such a rotor blade is relatively cheap to manufacture as the duration of the casting process can be minimized. Further, due to the individually and precisely controlled flows of composite fluid to different areas of the structure during prior to curing, the blade can exhibit excellent physical properties.

According to a yet further aspect of the invention, there is provided a wind turbine comprising a rotor blade according to the preceding aspect.

Such a wind turbine may exhibit an excellent relation between performance and price, as the manufacturing time and the requirement for manual interaction during manufacture are minimized, and the level at which design specifications can be met is improved.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination between features relating to different subject matters, in particular between features of the method type claims and features of the apparatus type claims, is considered as being explicitly disclosed by this document.

The aspects defined above and further aspects of the present invention are apparent from the examples of embodiments to be described hereinafter and are explained with reference to the examples of embodiments. The invention will be described in more detail hereinafter with reference to examples of embodiments to which, however, the invention is not limited.

BRIEF DESCRIPTION OF THE DRAWINGS

FIG. 2 shows a system for feeding a composite fluid to a mold in accordance with a second embodiment of the invention.

DETAILED DESCRIPTION

Figure 1:
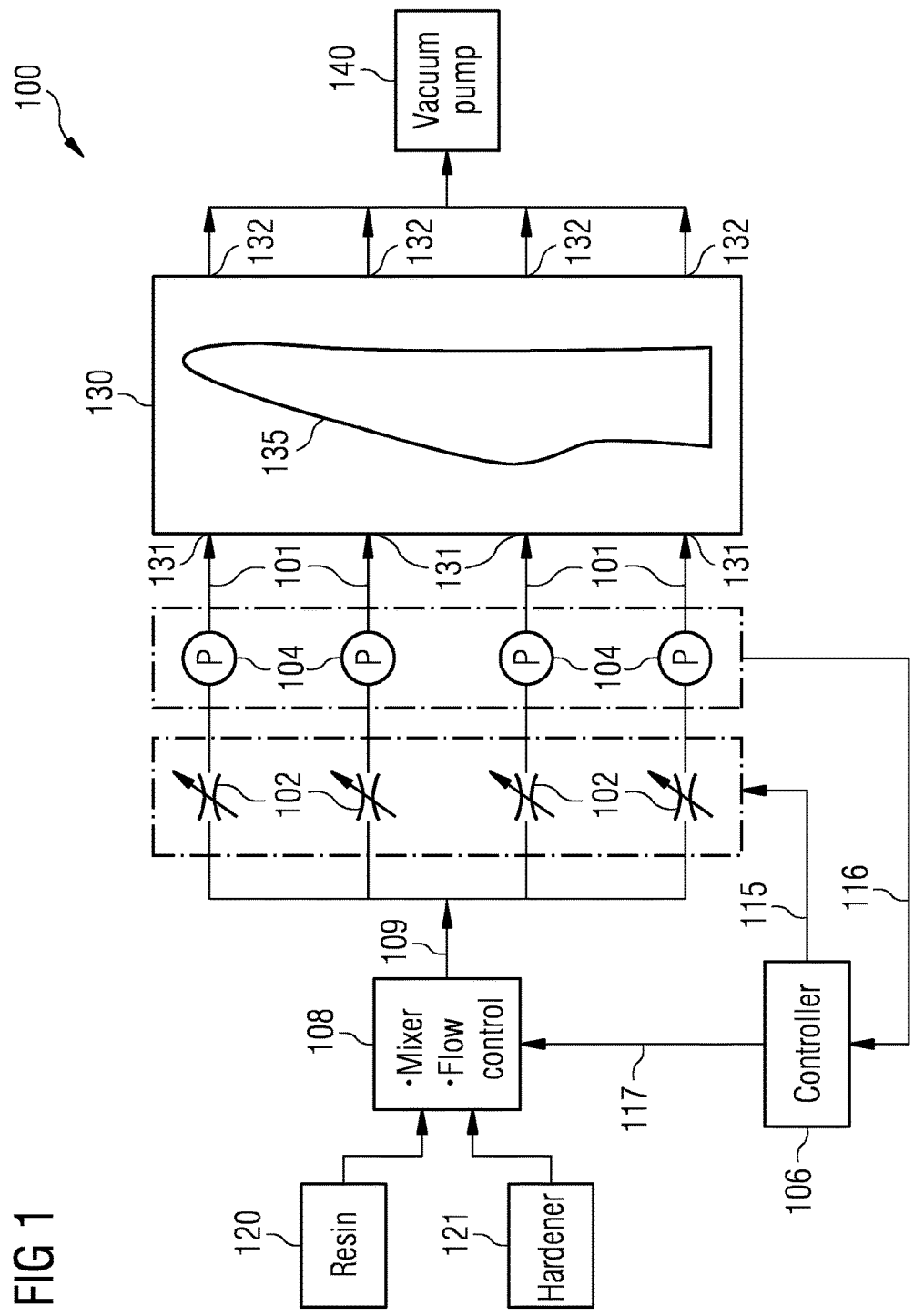
FIG. 1 shows a system for feeding a composite fluid to a mold in accordance with a first embodiment of the invention.

The illustrations in the drawings are schematically. It is noted that in different figures, similar or identical elements are provided with the same reference numerals or with reference numerals which only differ from the corresponding reference numerals within the first digit.

FIG. 1 shows a system 100 for feeding a composite fluid to a mold 130 in accordance with a first embodiment of the invention. The illustrated mold 130 is designed to cast a composite structure, such as a blade 135 for a wind turbine, by means of a Vacuum Assisted Resin Transfer Molding (VARTM) process. However, it is noted that the system 100 is not limited to be used with this particular kind of mold 130. Further, the mold 130 comprises four mold inlets 131 for receiving composite fluid during a casting process and four mold outlets 132. The mold outlets 132 are connected to a vacuum pump 140.

The depicted system 100 comprises four feeding units 101. Each feeding unit is shown as being connected to a corresponding mold inlet 131. The feeding units 101 are preferably constituted by tubes or pipes which may be made from any hard or flexible material which is suitable for feeding composite fluid, such as epoxy resin, to the mold 130. The connection between the feeding units 101 and the corresponding mold inlets 131 may be provided by any suitable connecting means (not shown) which allow a sealed fit of the tube or pipe to the mold 130.

Further, each feeding unit 101 is connected to or includes a respective pressure sensor 104 and a respective flow control unit 102, such as a valve or a clamp. All four feeding units 101 are further connected to a mixer 108 via a common connection 109. The mixer 108 is in turn connected to resin reservoir 120 and hardener reservoir 121. The mixer may be able to deliver a variable or controlled output of mixed resin and hardener through the common connection 109.

The system 100 further comprises a controller 106 which is connected to the valves 102 by means of cable 115, to the pressure sensors 104 by means of cable 116 and to the mixer 108 by means of cable 117. The controller 106 may be any electronic regulator or computer capable of generating and transmitting control signals to the valves 102 and mixer 108 in accordance with a control program stored in the controller 106. Further, the controller is capable of receiving output signals from the pressure sensors 104 and of taking these feed-back signals from the pressure sensors 104 into account when generating the aforementioned control signals for the valves 102 and mixer 108.

During the casting process, the controller 106 processes the signals received from the pressure sensors 104 and controls the flow of composite fluid fed to each of the mold inlets 131 individually based on these signals and in accordance with a process specific control program. That is, if the controller 106 determines that the pressure in a particular one of the feeding units 101 is too high or too low in comparison to a desired value and/or in comparison to the pressure in other feeding units 101, it will adjust one or more of the valves 104 and/or the amount of composite fluid provided by the mixer 108 in order to adjust the flow through the particular feeding unit 101. It should be noted that the pressure in a feeding unit 101 is directly indicative of the flow rate through the same feeding unit. Further, it should be noted that the adjustment may be carried out by closing or opening only the particular valve 102, by closing or opening one or more of the other valves 102, or by closing or opening the particular valve 102 and one or more of the other valves 102. Here, it should be noted that when one valve 102 is e.g. closed, the flow through one or more of the other feeding units will increase due to the increased flow resistance of the closed valve. It should also be noted, that the terms closing and opening are not intended to denote that the valve is necessarily completely closed or opened, but rather that the valve is adjusted to have a smaller (closing) or larger (opening) cross-sectional opening area.

The system 100 is capable of providing a desired amount of composite fluid through each of the mold inlets 131 during the entire casting process. Thereby, a particular composite structure 135 with varying composition of materials can be produced with high precision. Furthermore, by further controlling the output flow of mixed resin and hardener from the mixer 108, the duration of the casting and curing process can be reduced, and the use of a buffering container between the mixer 108 and the feeding units 101 is not necessary.

FIG. 2 shows a system 200 for feeding a composite fluid to a mold 230 in accordance with a second embodiment of the invention. The second embodiment differs from the first embodiment only in that a buffering container 211 is provided between the mixer 208 and the feeding units 201. Accordingly, the remaining elements and their functions will not be described in detail as these are similar to the ones described above with regard to the first embodiment and FIG. 1.

The buffering container 211 is connected to mixer 208 by means of connection 212. The buffering container 211 is further connected to the feeding units 201 via connection 213 and designed to store a certain amount of composite fluid 214. Thereby, if the mixer 208 outputs more composite fluid 214, i.e. mixture of resin and hardener, than the feeding units 201 are capable of feeding to the mold 230 at a particular time during the casting procedure, the risk of overflow or leakage at the mold inlets 231 can be reduced. Furthermore, the mixer 208 need only be controllable to turn its output on and off. That is, in this embodiment, the mixer 208 and the control program of the controller 206 may be simplified in comparison to the first embodiment.

It should be noted that the term "comprising" does not exclude other elements or steps and the use of articles "a" or "an" does not exclude a plurality. Also elements described in association with different embodiments may be combined. It should also be noted that reference numerals in the claims are not to be construed as limiting the scope of the claims.

The invention claimed is:

1. A system for feeding a composite fluid to a mold for casting a reinforced composite structure comprising a rotor blade for a wind turbine, the system comprising:
   a mold adapted for casting a reinforced composite structure, wherein the mold comprises a plurality of inlets distributed along the mold, such that each of the plurality of inlets feeds a different particular region within the mold,
   a common connection adapted for delivering a composite fluid comprising mixed resin and hardener, a first feeding unit connected to the common connection for feeding a first flow of the composite fluid to the mold through a first mold inlet that feeds a first particular region within the mold,
   a second feeding unit connected to the common connection for feeding a second flow of the composite fluid to the mold through a second mold inlet that feeds a second particular region within the mold,
   a first sensor configured to detect a first value which is indicative of a flow rate of the first flow of composite fluid, and
   a second sensor configured to detect a second value which is indicative of a flow rate of the second flow of composite fluid,
   a controller for receiving and processing the first and second values indicative of flow rates and individually controlling the first flow of composite fluid and the second flow of composite fluid, such that appropriate amounts of composite fluid are provided to the different particular regions of the mold during the casting process for optimal distribution of the composite fluid.

2. The system as set forth in claim 1, further comprising a first flow control unit controlled by the controller for adjusting the first flow of composite fluid fed by the first feeding unit, and
   a second flow control unit controlled by the controller for adjusting the second flow of composite fluid fed by the second feeding unit.

3. The system as set forth in claim 2,
   wherein the first flow control unit and the second flow control unit comprise valves which are manually or automatically controllable.

4. The system as set forth in claim 1,
wherein the plurality of inlets are distributed longitudinally and arranged at different heights along the mold,
wherein the first sensor is arranged at the first mold inlet or at the first particular region within the mold, and
wherein the second sensor arranged at the second mold inlet or at the second particular region within the mold,
wherein the first and second sensors are adapted to detect static pressure drops between the first and second mold inlets due to their arrangement at different heights which cause different amounts of composite fluid to flow through the respective mold inlets per time unit.

5. The system as set forth in claim 2, wherein the controller is adapted to automatically control the first flow control unit and the second flow control unit based on the first value and on the second value.

6. The system as set forth in claim 5,
wherein the controller is adapted to reduce the first flow if the first value exceeds a first threshold value or if the second value is below a second threshold value.

7. The system as set forth in claim 1, further comprising a mixing device which is configured to provide the composite fluid to the common connection.

8. The system as set forth in claim 7, wherein the controller controls a composition of resin and hardener in the mixing device.

9. The system as set forth in claim 5, further comprising a mixing device which is configured to provide composite fluid to the common connection, and wherein the controller is further adapted to control the composition of the composite fluid and the flow of composite fluid output by the mixing device.

10. The system as set forth in claim 9, further comprising a third sensor configured to detect a third value which is indicative of the flow rate of the flow of the composite fluid output by the mixing device, and wherein the controller is further adapted to control the flow of the composite fluid output by the mixing device based on said third value.

11. The system as set forth in claim 9, further comprising a buffering container for receiving the composite fluid which is arranged between the mixing device and the first feeding unit and second feeding unit.

12. The system as set forth in claim 1,
wherein the first sensor is one of a pressure sensor and a flow meter and the second sensor is one of a pressure sensor and a flow meter.

13. The system as set forth in claim 12,
wherein the first sensor and the second sensor are pressure sensors, and wherein the system further comprises:
a first valve for controlling the first flow of composite fluid fed by the first feeding unit,
a second valve for controlling the second flow of composite fluid fed by the second feeding unit,
a controller connected to the first valve, the second valve, the first sensor and second sensor,
wherein the controller is configured to process signals received from the first sensor and the second sensor indicating a pressure of composite fluid within the first feeding unit and second feeding unit, and wherein the controller is configured to adjust one or more of the first valve and the second valve to adjust one or more of the first flow through the first feeding unit and the second flow through the second feeding unit.

14. The system as set forth in claim 7, further comprising:
a resin reservoir; and
a hardener reservoir;
wherein the mixing device is connected to the resin reservoir and the hardener reservoir and wherein the mixing device is controlled by the controller to deliver a variable or controlled output of mixed resin and hardener through the common connection to the first feeding unit and the second feeding unit.

15. The system as set forth in claim 1,
wherein the reinforced composite structure comprises a rotor blade for a wind turbine.

16. The system as set forth in claim 1, further comprising a vacuum pump connected to a plurality of mold outlets of the mold, wherein the vacuum pump is adapted to provide Vacuum Assisted Resin Transfer Molding (VARTM).

17. A method of feeding a composite fluid to the system of claim 1, the method comprising:
feeding a first flow of composite fluid to the mold through the first mold inlet,
feeding a second flow of composite fluid to the mold through the second mold inlet,
detecting a first value indicative of a flow rate of the first flow of composite fluid using the first sensor,
detecting a second value indicative of a flow rate of the second flow of composite fluid using the second sensor, and
individually controlling the first flow of composite fluid and the second flow of composite fluid.

* * * * *